(12) United States Patent
Westheimer et al.

(10) Patent No.: US 11,076,091 B1
(45) Date of Patent: Jul. 27, 2021

(54) IMAGE CAPTURING ASSISTANT

(71) Applicant: Amazon Technologies, Inc., Seattle, WA (US)

(72) Inventors: Nathaniel Westheimer, Seattle, WA (US); Samir Raj Hegde, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 16/529,619

(22) Filed: Aug. 1, 2019

Related U.S. Application Data

(63) Continuation of application No. 15/697,843, filed on Sep. 7, 2017, now Pat. No. 10,425,578.

(51) Int. Cl.
*H04N 5/232* (2006.01)
*G06F 3/16* (2006.01)
*G10L 15/22* (2006.01)

(52) U.S. Cl.
CPC ......... *H04N 5/23222* (2013.01); *G06F 3/167* (2013.01); *H04N 5/23216* (2013.01); *G10L 15/22* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 2004/0097261 A1 | 5/2004 | Ujii | |
| 2005/0134946 A1* | 6/2005 | Tsue | H04N 1/0035 358/537 |
| 2008/0068466 A1 | 3/2008 | Tamaru | |
| 2009/0231441 A1* | 9/2009 | Walker | H04N 5/77 348/207.1 |
| 2010/0020227 A1 | 1/2010 | Robinson | |
| 2011/0314049 A1 | 12/2011 | Poirier | |
| 2011/0317031 A1* | 12/2011 | Honda | H04N 5/23219 348/229.1 |
| 2012/0277914 A1* | 11/2012 | Crow | H04N 5/23299 700/259 |
| 2013/0050507 A1 | 2/2013 | Syed | |
| 2016/0217328 A1* | 7/2016 | Yanai | G06K 9/22 |
| 2016/0219048 A1 | 7/2016 | Porras | |
| 2017/0054899 A1* | 2/2017 | Sadhwani | G06K 9/00684 |
| 2017/0064214 A1 | 3/2017 | Zhang | |
| 2017/0208243 A1* | 7/2017 | Masad | G06K 9/3233 |
| 2017/0208245 A1* | 7/2017 | Castillo | G06T 7/0002 |
| 2017/0374280 A1 | 12/2017 | Chan | |
| 2018/0213145 A1 | 7/2018 | Guo | |
| 2019/0246042 A1* | 8/2019 | Liu | H04N 5/23299 |
| 2020/0077017 A1* | 3/2020 | Ji | G06K 9/46 |

OTHER PUBLICATIONS

Nikon. Digital Camera Coolpix S33 Reference Manual. 2015.

* cited by examiner

*Primary Examiner* — Quan Pham
(74) *Attorney, Agent, or Firm* — Knobbe Martens Olson & Bear LLP

(57) ABSTRACT

Features are disclosed for interacting with a user to take a photo when the user is actually ready. The features combine computer vision and voice recognition to determine when the user is ready. Additional features to interact with the user to compose the image are also described. For example, the system may play audio requesting a response (e.g., "move a bit to the left" or "say cheese"). The response may include a user utterance or physical movement detected by the system. Based on the response, the image may be taken.

18 Claims, 6 Drawing Sheets

IMAGE CAPTURING ASSISTANT

CROSS-REFERENCE TO RELATED APPLICATION

This application is a continuation of U.S. patent application Ser. No. 15/697,843, entitled "IMAGE CAPTURING ASSISTANT" and filed Sep. 7, 2017, which is hereby incorporated by reference herein in its entirety.

BACKGROUND

This application generally describes systems, devices, and methods for assistive technologies for capturing images.

BRIEF DESCRIPTION OF THE DRAWINGS

Embodiments of various inventive features will now be described with reference to the following drawings. Throughout the drawings, the examples shown may re-use reference numbers to indicate correspondence between referenced elements. The drawings are provided to illustrate example embodiments described herein and are not intended to limit the scope of the disclosure.

DETAILED DESCRIPTION

Figure 1:
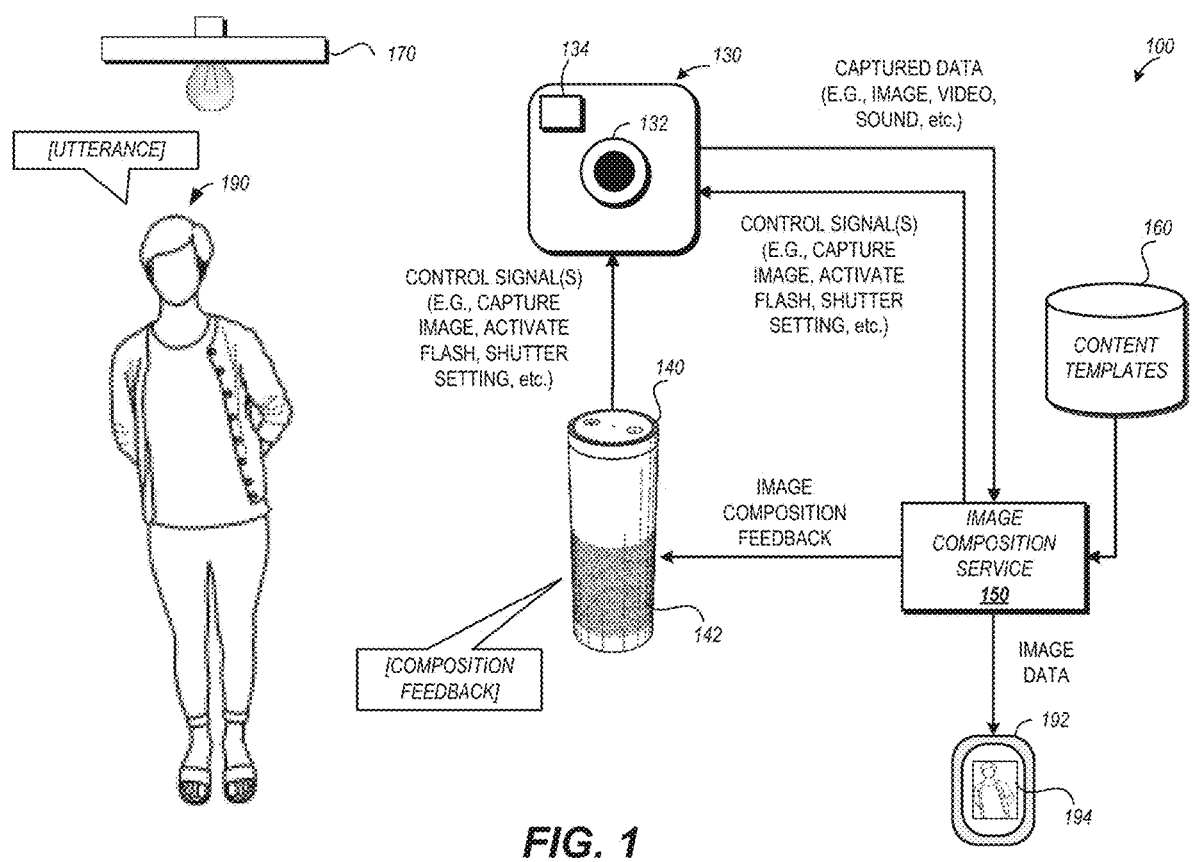
FIG. 1 is a pictorial diagram depicting an illustrative environment in which an example embodiment of an image capturing assistant is used.

An image capturing system may generally include an image sensor configured to capture one or more images of a subject at a location. Cameras may use a simple timer method to determine when to take a photo for a user. For some cameras a user may adjust the camera to indicate a duration of time (e.g., between ~3 and ~10 seconds) before the shutter is activated to capture an image. Such timing features allow a user to adjust the image sensor to a desired view, activate the timer, and then join the view. This is an example of how group photos may be taken.

Such timer features require a series of steps to pose the view, adjust the image sensor and any other hardware that may impact the view (e.g., overhead lighting, background light, ambient light sources, etc.), trigger the timer, and enter the scene before expiration of the timer period. These steps can be awkward and cause capturing of images that appear posed, hurried, or otherwise unnatural. Furthermore, once the image is captured, a user may return to the imaging device to review the image to determine whether the image is adequate or if another image needs to be taken (e.g., not everyone was smiling, someone had their eyes closed, a random portion of a person or object is seen in the image, the group is not centered in the image, more or less lighting is needed to see everyone's face, etc.).

The features described in the present application go beyond a count-down to interact with users in a way which enables capturing of images when the user is actually ready. The features combine computer vision with voice recognition to determine when the user is ready based on assisted feedback. For instance, a user may initiate an image capture mode using an utterance such as "Alexa, take a photo." The utterance may be captured by an assistive device and, using natural language processing, the user's intent determined. Based on the intent, the assistive device may reply with assistive commands related to capturing the image. For example, the device may play audio stating: "Okay, when you're ready say 'cheese'." The assistive device may then monitor audio to capture an utterance of the user (or a group) saying "Cheese."

As another example of an assistive command, the assistive device may play audio stating: "Okay, smile when you are ready." The assistive device may then monitor image data using real-time computer vision analysis to trigger the taking of the image once a smile (or critical mass of smiles, if more than one person is in the shot) have been detected. If the user is out of frame or not in a good configuration to have an evenly illuminated image, the assistive command may include audio to further instruct the user to "Move to the center of the frame" or "Get closer together." In some implementations, the assistive command may be transmitted to an interconnected device such as a smart lightbulb, an automated window treatment, or other device impacting the amount of light for the image. The assistive command may iteratively adjust such devices to achieve a desired image quality. The described interaction features based in part on computer vision and voice can guide the user to take a great and memorable photograph.

Although the examples and implementations described herein focus, for the purpose of illustration, on using image capturing systems for assisted image capture, one skilled in the art will appreciate that the techniques described herein may be applied to other processes, methods, or systems. For example, the techniques may be used with other types of systems that collect and process image data for purposes other than entertainment or personal use. For example, the features may be used in an image based security system to capture image data in an assisted fashion. Various aspects of the disclosure will now be described with regard to certain examples and embodiments, which are intended to illustrate but not limit the disclosure.

FIG. 1 is a pictorial diagram depicting an illustrative environment in which an example embodiment of an image capturing assistant is used. The environment 100 may include an image capturing device 130 to capture one or more images of subjects such as a user 190 within a field of view for the image capturing device 130.

The image capturing device 130 is shown as a camera but may be implemented as another optical scanning device. In some implementations, the image capturing device 130 may be implemented with or within another physical item such as within a television, a set-top-box, a mobile phone, a mirror, a door, a window, a dashboard display panel, an appliance, a video conferencing system, or the like. The image capturing device 130 may transmit monitoring data such as image data, video data, audio data, location data, or the like collected by a sensor 132 the image capturing device 130. For ease of explanation, the sensor 132 will be referred to in the singular, but should be understood to cover single and array configurations whereby in an array configuration, the array may include a homogeneous or heterogeneous array of sensors.

In some implementations, the image capturing device 130 may include an illuminator 134 that can emit different wavelengths of light. The illuminator 134 may be activated to emit different wavelengths to capture a series of images under different illumination conditions. In some implementations, the illuminator 134 may emit infrared or other light that may not be visible to the human eye, but can be detected by an image sensor such as an infrared sensor, depth sensing camera, or the like. The captured data collected by the image capturing device 130 may be transmitted via a wired or wireless transceiver (not shown), via a network (not shown), to an image composition service 150.

The image composition service 150 may be configured to analyze captured data to determine a quality of the captured data. For example, a content templates data store 160 may include a library of content templates defining optimal composition for various scenes (e.g., group photos, selfies, landscapes, close-ups, night scenes, location specific scenes (e.g., beach, forest, indoor, etc.), or the like). The templates may be stored in association with keywords or key image features that can be used to identify which templates apply for a given scene represented by captured data. For example, the captured data may include geocoordinates of a location where the image capturing device 130 was located when the data was captured. The geocoordinates may be associated with a specific location such as a park or within a home. Each specific location may have particular lighting needs which can be used to select a composition template (e.g., scene template). As another example, an image may be captured that shows two faces. A composition template for two people may be selected based on analysis of the image indicating that two people are included in the image.

The analysis of the image data may include machine learning or other artificial intelligence. For example, a content template type may be identified by a machine learning model such as a neural network. The model may receive all or a portion of the image data as an input value and generate output information identifying a scene type associated with the image data. In some implementations, the output information may include a confidence value indicating a degree of certainty in the identified scene type is the actual scene type. The content template may be implemented as a machine learning model such as a neural network. The model may receive image data as an input value and generate composition feedback based on processing of the input value. The composition feedback generated by the model may be a vector of values whereby each element in the vector represents a deviation for an image characteristic from a desired characteristic. For example, the output vector may include a color deviation value, an object location deviation value, a resolution deviation value, or the like.

The image composition service 150 may analyze the image represented by the captured data with an identified composition template. If the image deviates from the composition template, the image composition service 150 may provide image composition feedback to an assistive device 140. The assistive device 140 may generate composition feedback, such as audio feedback for playback via a speaker 142 or other presentation element included in or in data communication with the assistive device 140.

The image composition service 150 may additionally or alternatively transmit one or more control signals to the image capturing device 130 to address a deviation detected between the image and the composition template. For example, if the brightness of the image is below a threshold brightness level indicated by the composition template, the control signal may cause the image capturing device 130 to activate the illuminator 134.

In some implementations, the image composition service 150 may store the captured data in a data store. This can facilitate later viewing of an image 194 represented by captured data on an access device 192. The access device 192 may be an electronic communication device configured to transmit and receive machine readable messages such as email, text messages, messages to activate an application or function of the access device 192 to initiate or view captured data described herein. Non-limiting examples of the access device 192 include a personal computing device, laptop computing device, hand held computing device, terminal computing device, mobile device (e.g., mobile phones or tablet computing devices), wearable device configured with network access and program execution capabilities (e.g., "smart eyewear" or "smart watches"), wireless device, electronic reader, media player, home entertainment system, gaming console, set-top box, television configured with network access and program execution capabilities (e.g., "smart TVs"), or some other electronic device or appliance. The messages may be formatted according to a standardized protocol such as TCP/IP, HTTP, or the like. The transmission may be sent wired, wireless, or hybrid wired-wireless networks.

As used herein a "data store" may be embodied in hard disk drives, solid state memories and/or any other type of non-transitory computer-readable storage medium accessible to or by a device such as an access device, server, or other computing device described. A data store may also or alternatively be distributed or partitioned across multiple local and/or remote storage devices as is known in the art without departing from the scope of the present disclosure. In yet other embodiments, a data store may include or be embodied in a data storage web service.

The image capturing device 130 may also receive a control signal from the assistive device 140. For example, the assistive device 140 may monitor the environment 100 for an utterance indicating that the user 190 is ready to have her picture taken. Upon detecting the utterance, the assistive device 140 may transmit a control signal to activate capturing of data to the image capturing device 130. In some implementations, it may be desirable to initiate capturing of a series of images after playing an assistive utterance. For example, if the assistive device 140 receives image composition feedback indicating that the subject of an image is left of center, the assistive device 140 may play audio stating, "Move a bit to your right" to position the subject toward the center of the field of view. Upon playing the audio, the assistive device 140 may transmit a control signal to begin capturing images as the user 190 adjusts position. The image composition service 150 may in turn transmit composition feedback indicating whether the user 190 is positioned according to the template (e.g., centered), or identifying the deviation from the content template. If still left of center, the assistive device 140 may play audio stating, "Keep going" whereas if the user 190 is detected right of center, the assistive device 140 may play audio stating, "Oops, too far, back to your left." If the user 190 has adjusted to the desired position, a confirmation message may be presented. Thus, the position information may be included as part of a conversational context related to composing the image.

A control signal may also be transmitted to additional hardware in the environment 100 such as a smart lightbulb 170. The control signal may be transmitted by the image capturing device 130. For example, if the control signal received from the image composition service 150 indicates a quantity of light that cannot be satisfied using the illuminator 134, the image capturing device 130 may transmit a control signal to the lightbulb 170 to provide additional lighting. The control signal may be transmitted directly to the smart lightbulb 170 from the image composition service 150 or the assistive device 140.

Figure 2:
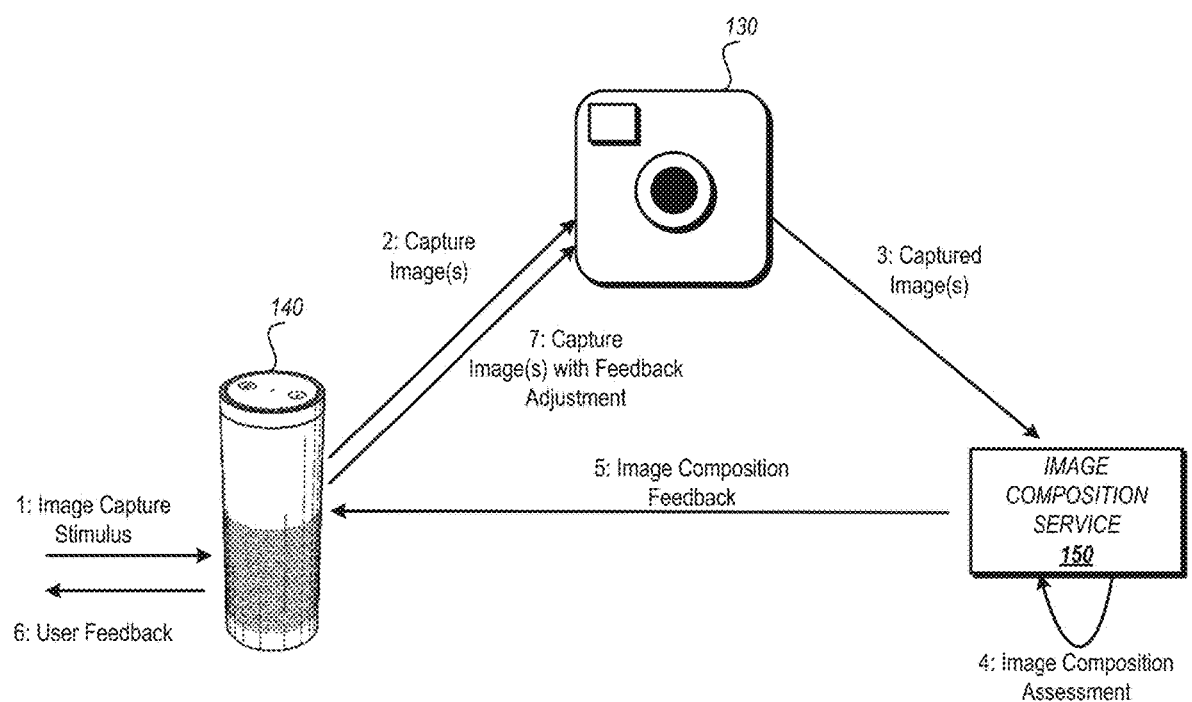
FIG. 2 is a pictorial diagram depicting component interactions for assisted image capturing.

FIG. 2 is a pictorial diagram depicting component interactions for assisted image capturing. The assistive device 140 may receive an image capture stimulus. The image capture stimulus may be detection of an utterance, activation of a physical control element (e.g., button), or receipt of a message such as from the access device 192 of the user 190 activating an image capture mode for the assistive device 140. The assistive device 140 may then transmit a control signal to the image capturing device 130 to begin capturing image(s). The captured image(s) and, in some implementations, related data (e.g., time, location, a type of image capturing device, an identifier of the image capturing device 130, etc.) may be transmitted to the image composition service 150. In some implementations, the control signal may cause the image capturing device 130 to capture images at a first quality level that includes sufficient information for composition assessment, but minimizes the resources needed to conduct the assessment. For example, it may be sufficient to provide a low resolution greyscale image to the image composition service 150 to assess whether users shown in the scene are facing the camera, are organized according to a composition template, or the like. These determinations may be performed using a greyscale image which can be captured and represented using fewer resources than, for example, a print-quality high-resolution color photo. By including such efficient analysis images, the speed with which the image can be assessed may be increased to allow real-time assistance in composing and capturing images.

The image composition service 150 may perform analysis of the images to generate image composition feedback. The analysis may include identifying a type of scene shown in the image (e.g., group photos, selfies, landscapes, close-ups, night scenes, location specific scenes (e.g., beach, forest, indoor, etc.), or the like). The scene type may be identified based on object recognition within the image, color analysis of the image, image orientation (e.g., portrait or landscape), estimated age of subjects shown in the image, type of object shown (e.g., people, car, house, animal, etc.), scene detection, scene analysis, or other computer vision image assessment. The image composition service 150 may additionally or alternatively include other captured data such as location, time, image capture device type, or audio data (if included) to identify the scene type. For example, acoustic analysis may be included to identify how many people may be in the picture and/or locations for the people. The captured data may include information from more than one sensor. For example, the environment 100 may include the image capturing device 130 as a primary source of capture data and the access device 192 may be configured to capture audio and/or video data in the environment 100.

The scene type or data indicating a scene type may be used to select a composition template such as from the composition template data store 160. The image composition service 150, as part of the analysis to generate image composition feedback, may compare aspects of an image with corresponding target values for the aspect specified by the composition template. The aspect may include objects shown in the image or characteristics of the image such as lighting characteristics, color characteristics, image resolution, image file size, or the like. If differences are detected, the differences may be identified in the image composition feedback. The composition feedback may control one or more devices used to capture the image data (e.g., the image capturing device, lightbulb, alternate optical scanning device) to reduce the difference between the original image and the ideal image represented by the composition template.

Figure 3A:
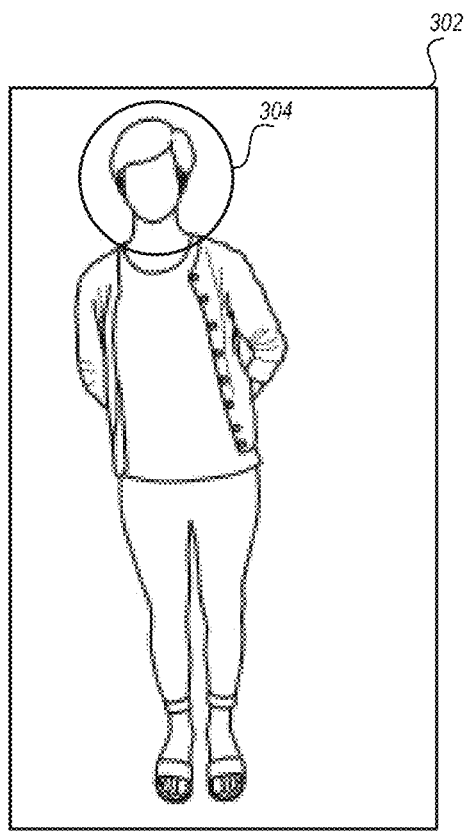
FIG. 3A and FIG. 3B are pictorial diagrams of an image and detected assistance for the image.
Figure 3B:
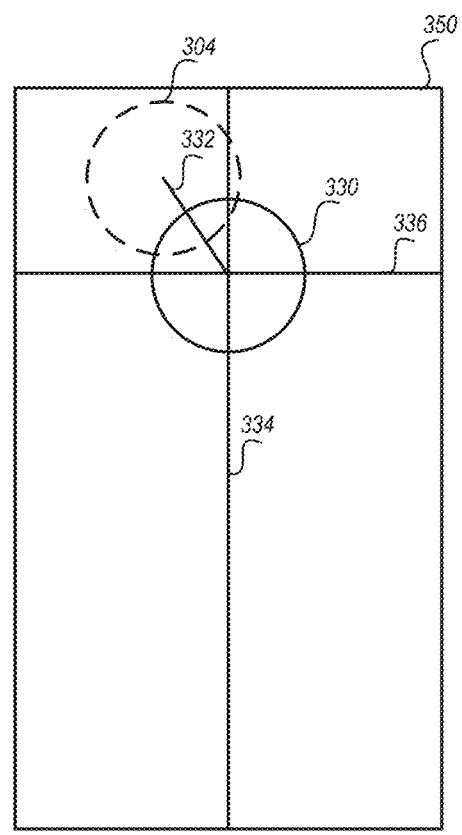

FIG. 3A and FIG. 3B are pictorial diagrams of an image and detected assistance for the image. In FIG. 3A, an image 302 shows the user. The scene type of the image 302 may identified based on the inclusion of only one face 304 in the image. The scene type may be identified as solo portrait based on the face 304 and size thereof. For example, if the face 304 occupied a larger portion of the image 302, the scene type may be identified as a selfie (e.g., close up self-portrait).

FIG. 3B shows a template 350 for a scene type showing a portrait of a single person. The template 350 may include a vertical focal line 334 and a horizontal focal line 336. The intersection of the vertical focal line 334 and the horizontal focal line 336 may identify a location 330 within an "ideal" image where the face of the single person should be shown. The actual location of the head 304 deviates from the location 330. A line 332 identifies the deviation and may be characterized by a direction and a magnitude. The direction and magnitude of difference may be provided by the image composition service as the image composition feedback.

The template 350 may include additional image characteristics such as color, light level, or the like. These image characteristics of the composition template may be compared with the image characteristics of the image 302. Deviations, or deviations that exceed a threshold, may be included in the composition feedback. As noted, the composition template may include a neural network model trained to generate composition feedback. The neural network model may be trained using previously captured images and associated predetermined composition feedback. This model may represent a starting point for composition feedback. For example, in some implementations, a single model may be trained for all users. A user interface may be provided to allow specific users to provide individual composition feedback for previously captured images. Using the provided metrics, a custom model may be trained to reflect the taste of the specific user.

Returning to FIG. 2, the composition feedback generated by the image composition service 150 may include an indicator of when to capture an image or a particular captured image to present. For example, the image capture device 130 may capture a stream of images. The image composition service 150 may analyze individual images using the composition template to identify the "best" image from the stream. The "best" image may be the image with the fewest deviations from the composition template. In some implementations, it may be desirable to include additional characteristics of the image in identifying the "best" such as the highest resolution, highest contrast, lowest amount of white or black space, image that can be compressed to use the lowest amount of memory, or the like. A neural network model may be trained to generate a quality metric for captured images. One or more inputs to the neural network model may include image data and the output may include the quality metric for the image. The neural network model may be trained using previously captured images and associated quality metrics for each. In some implementations, a single model may be trained for all users. In some implementations, a user interface may be provided to allow specific users to provide individual quality metrics for previously captured images. Using the provided metrics, a custom model may be trained to reflect the taste of the specific user.

The image composition feedback may be transmitted to the assistive device 140. As noted, although not shown in FIG. 2, the image composition feedback may include one or more control signals transmitted to the image capture device 130. In FIG. 2, the assistive device 140 may present user feedback based on the composition feedback. The composition feedback may be presented using audio, visual elements (e.g., words, graphics, light), or a combination thereof. The presentation may be via the assistive device 140 such as by playing audio via the speaker 142. In some implementations, the presentation may cause the illumination of an arrow or other indicator on the assistive device 140 or the image capturing device 130. In some implementations, the presentation may be via the access device 192 or other electronic device within the environment 100.

The assistive device 140 may, in some implementations, transmit one or more control signals to the image capturing device 130 to initiate or continue capturing of image data. In some implementations, a control signal may include configuration to activate or deactivate on the image capturing device 130. For example, the control signal may include a configuration to activate the illuminator 134 of the image capturing device 130. The data captured by the image capturing device 130 may be transmitted to the image composition service 150 for additional processing as described.

The control signals transmitted after presenting the feedback may cause the image capturing device 130 to capture image data in a different format than the images initially analyzed. For example, if the feedback indicates that the scene is organized according to a template for the scene type, the image composition feedback may indicate that the scene is ready for capture. In such instances, the control signal may cause the image capturing device 130 to capture more detailed image data (e.g., higher resolution, detailed color mode, etc.) than images captured for providing composition feedback about the scene.

Figure 4:
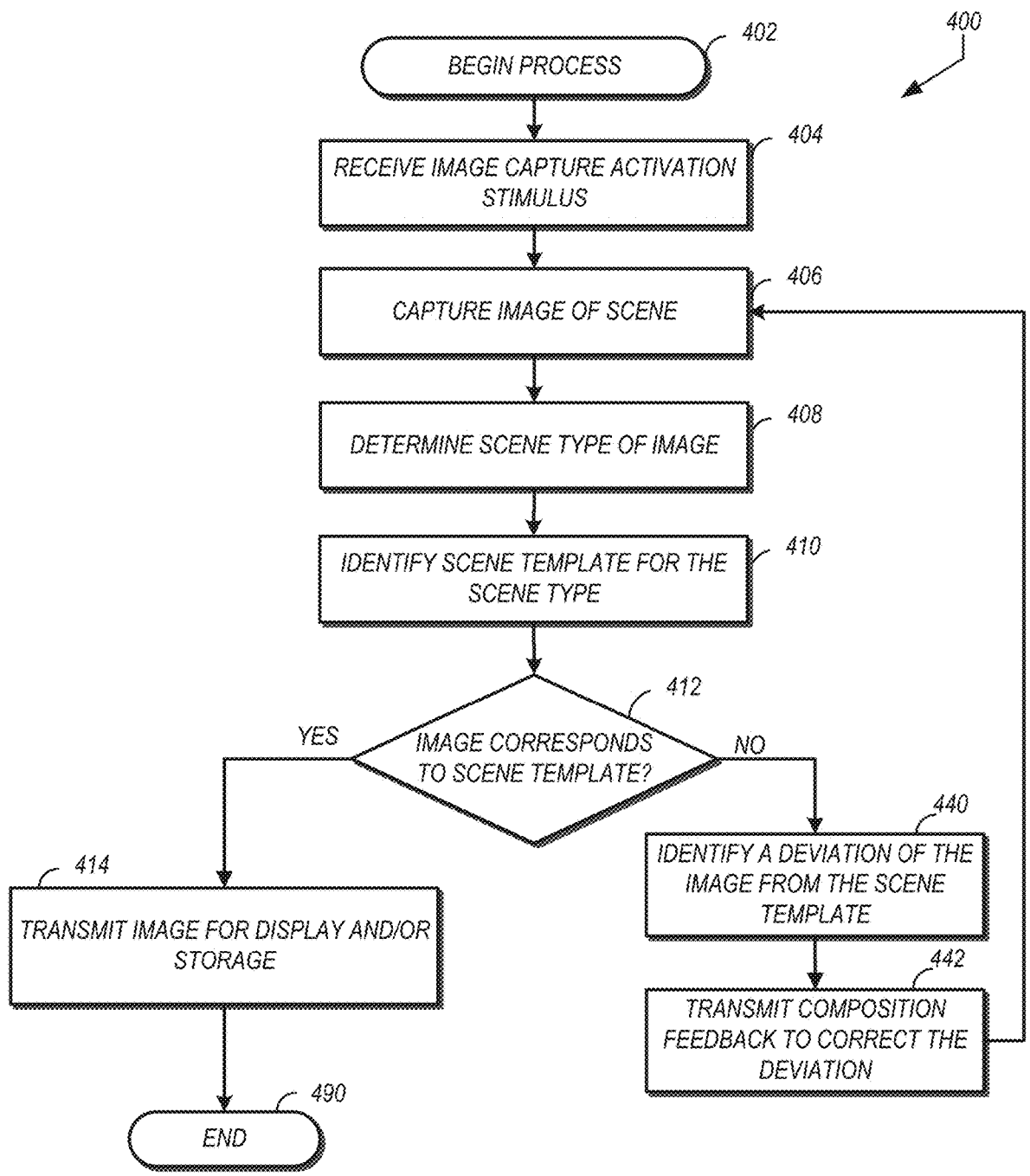
FIG. 4 is a flow diagram depicting an example method of image capturing assistance.

FIG. 4 is a flow diagram depicting an example method of image capturing assistance. The method 400 illustrates some steps in a process for providing image composition assistance. The method 400 may be implemented using one or more of the composition devices described herein such as the image composition service 150 or the assistive device 140.

The method 400 begins at block 402. At block 404, an image capture activation stimulus may be received by the composition device. The activation stimulus may be a user utterance such as "Alexa, let's take a picture." The activation stimulus may be an image based stimulus. For example, an image sensing device may monitor an environment for a gesture or an arrangement of subjects (e.g., users) in a field of view. Upon detecting a group gathering in the field of view or the gesture (e.g., a peace sign, a winking eye, smiling faces) the composition device may cause the capturing of an image of the scene at block 406. The capturing of an image may include collecting image data alone or in conjunction with additional captured data such as the location of the image capture, the image sensing device performing the capturing, time or date information indicating when the image was captured, lighting or other image sensing device configuration (e.g., shutter speed, resolution, color mode) used for capturing the image.

At block 408, the composition device may determine a scene type for scene shown in the image captured at block 404. A scene type may be a group photo, a selfie, a landscape, a close-up, a night scene, a location specific scene (e.g., beach, forest, indoor, etc.), or the like. The scene type may be identified using computer vision analysis of the image. The scene type may be identified using addition captured data such as location, time, date, audio, or other data received as part of the image capture.

At block 410, the composition device may identify a composition template based at least in part on the scene type. The composition template may identify, for the scene type, a desired arrangement to provide a particular look (e.g., aesthetically pleasing, conforming to a standardized perspective, etc.). One example of a composition template is shown in FIG. 3B, discussed above.

At block 412, the composition device may determine whether the captured image corresponds to the composition template. Correspondence between an image and a composition template may include identifying an object (e.g., face) in the image and a desired location for the object in the composition template. Correspondence may include determining a magnitude of difference between the object's location and the desired location. If the magnitude is below a threshold, the determination at block 412 may be affirmative. Correspondence may include color analysis of the image. For example, an average brightness or a mean contrast level may be generated for the image and compared to a brightness or contrast level for the composition template. If the generated value is within a threshold of the composition template value, the determination at block 412 may be affirmative. It will be understood that other or additional features of the image may be assess vis-à-vis the composition template to determine how closely the image matches the "ideal" embodied by the composition template.

If the determination at block 412 is affirmative, at block 414, the composition device may cause display or storage of the image. Block 414 may include transmitting the image to a display device or data store. The method 400 may then end at block 490.

Returning to block 412, if the image does not correspond to the composition template, at block 440, the composition device may identify a deviation of the image from the composition template. The deviation may be physical arrangement of an aspect (e.g., an object or a property) of the captured image (e.g., lighting, audio quality, etc.) Identifying the deviation may include generating the magnitude and direction of difference for an aspect.

Based on the deviation, at block 442, composition feedback may be generated and transmitted by the composition device to correct the deviation. The composition feedback may include presentable feedback such as text or audio guidance. The composition feedback may include control signals for the image capturing device or other device in the environment. Once the composition feedback is provided, the method 400 may return to block 406 to capture another image for assessment as described.

Figure 5:
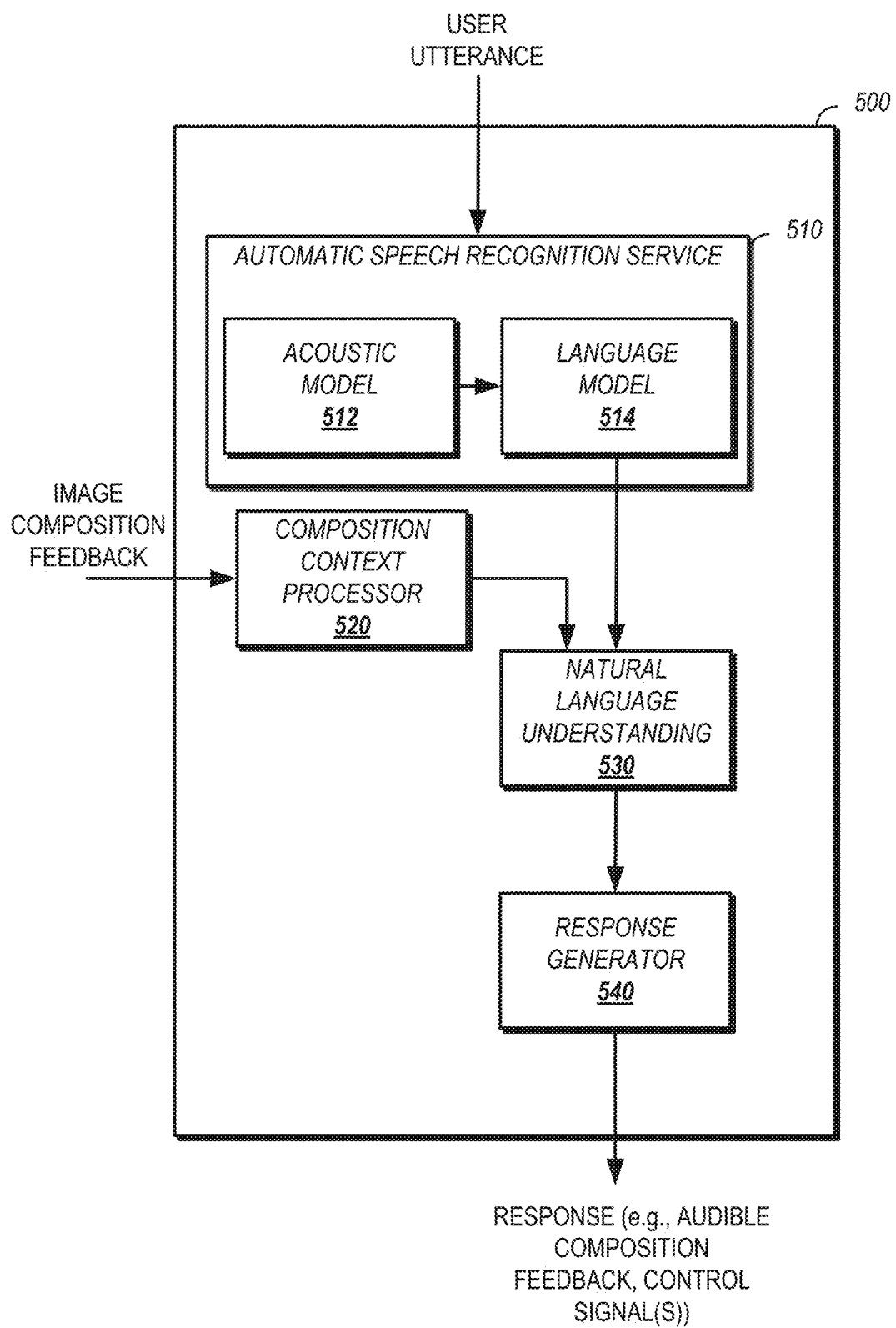
FIG. 5 is a block diagram of an illustrative language processing system containing an assistive image capturing response generator.

FIG. 5 is a block diagram of an illustrative language processing system containing an assistive image capturing response generator. The language processing system 500 can be any computing system that is configured to communicate via a communication network. In some implementations, the language processing system 500 may be implemented within the assistive device 140 or as any number of server computing devices, desktop computing devices, mainframe computers, and the like providing language processing services. In some implementations, the language processing system 500 may be implemented within the image composition service 130 and configured to receive audio data from the assistive device 140. In some embodiments, the language processing system 500 can include several devices physically or logically grouped together, such as an application server computing device configured to perform speech recognition on an utterance and a database server computing device configured to store records and speech recognition models.

The language processing system 500 can include an automatic speech recognition (ASR) service 510, a natural language understanding (NLU) service 530, a composition context processor 520, and a response generator 540. In some embodiments, the language processing system 500 can include various modules and components combined on a single device, multiple instances of a single module or component, etc. For example, the spoken language processing system 500 may include a separate response generator 540 server; a separate composition context processor 520 server; and a server or group of servers configured with ASR and NLU services 510 and 530. In multi-device implementations, the various devices of the language processing system 500 may communicate via an internal communication network, such as a corporate or university network configured as a local area network ("LAN") or a wide area network ("WAN"). In some cases, the devices of the language processing system may communicate over an external network, such as the Internet, or a combination of internal and external networks.

In some embodiments, the features and services provided by the language processing system 500 may be implemented as web services consumable via a communication network such as a cellular network, packet data network, satellite network, or the like. In further embodiments, the language processing system 500 may be provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

In some embodiments, the language processing system 500 may include fewer or additional modules than those shown in FIG. 5. For example, the language processing system 500 may interact with applications or services that are hosted by or otherwise associated with systems separate from the language processing system 500. In some embodiments, the response generator 540 may include an image context processor 520. In other embodiments, the composition context processor 530 may be logically or physically separate (e.g., in a different memory space or on a different computing device) from the response generator 540.

In some embodiments, some or all of the features or components of the language processing system 500 may be provided on the assistive device 140. For example, the assistive device 140 may include one or more of: the response generator 540, the image context processor 520, and the automatic speech recognition service 510. Such a client device 100 may therefore engage in composition conversations with the user 190 without exchanging information with a remote system.

The language processing system 500 may receive a device-directed user utterance such as a keyword to activate image capturing mode or initiate the capturing of an image. The ASR service 510 can receive and process the audio input of the user utterance, perform speech recognition on the input, and generating results (e.g., one or more likely transcripts of the user utterance). The ASR service 510 may generate the result based in part on an acoustic model 512 and a language model 514. The acoustic model 512 may generate hypotheses regarding which subword units (e.g., phonemes or triphones) correspond to an utterance based on the acoustic features of the utterance. The language model 514 may be used to determine the most likely transcription of the utterance based on the hypotheses generated using the acoustic model and lexical features of the language in which the utterance is spoken.

As discussed in more detail above, composition feedback may be provided to the language processing system 500 such as from the assistive device 140 and/or the image composition service 150. The composition feedback information may include deviation of a captured image from a template of the scene shown in the image. In some implementations, the transcript of an utterance may be used to identify the scene type or content template therefor. The composition context processor 520 can utilize this image composition feedback information to provide additional composition guidance. For example, the composition context processor 520 may determine through image composition feedback that the user 190 remains off center from the composition template. The image composition context processor 520 may utilize the current and at least a portion of previously provided image composition feedback to provide context for further image composition guidance. The image context processor 520 may provide such information to the NLU service 530 for further processing. For example, after the assistive device 140 presents guidance information asking the user 190 to move in a given direction, subsequently received image composition feedback can be compared to the original guidance to generate an understanding of a subsequently received utterance such as from the user 190 asking, "Does this look better?" The ASR results from ASR module 300 may also be provided to the NLU service 530. The NLU service 530 can determine a semantic meaning from the recognized speech and the composition context from the composition context processor 520 to determine the user's intent relative to the previous composition guidance.

The NLU service 530 may provide its results to the response generator 540. The response generator 120 may generate a response to the user's query based in part on the contextual information and playback location information of the media content. For example, the response generator 120 may determine that the most appropriate response for the user 190 based on her previous movement may be to use a word indicating a greater or lesser magnitude adjustment. For example, if the original composition guidance was "take a small step to the left" with the goal of correcting a discrepancy of 2 feet and the user 190 took a 3 foot stride to the left, the generated guidance response may be to "take a tiny step to the right." In this example, "tiny" is intended to indicate a smaller change than was elicited from the use of the word "small". The response generator 540 may also determine that the most appropriate response may be to ask the user 190 for additional information. The response generated by the response generator 540 may be media output, such as an audio response, text response, video response, video and audio response, video and text response, etc. The response generated by the response generator 540 may include one or more control signals to adjust one or more devices in the environment 100 such as the image sensing device 130 or the lightbulb 170. The assistive device 140 may then present the response to the user 190 or target device in the environment 100.

The language processing system 500 provides an example of how natural language processing hardware may improve image composition responses through consideration of image composition feedback. Because the conversation between the assistive device 140 and the user 190 includes non-verbal information (e.g., how the scene looks), this additional stream of information can refine the responses and assistance generated by the language processing system 500.

Figure 6:
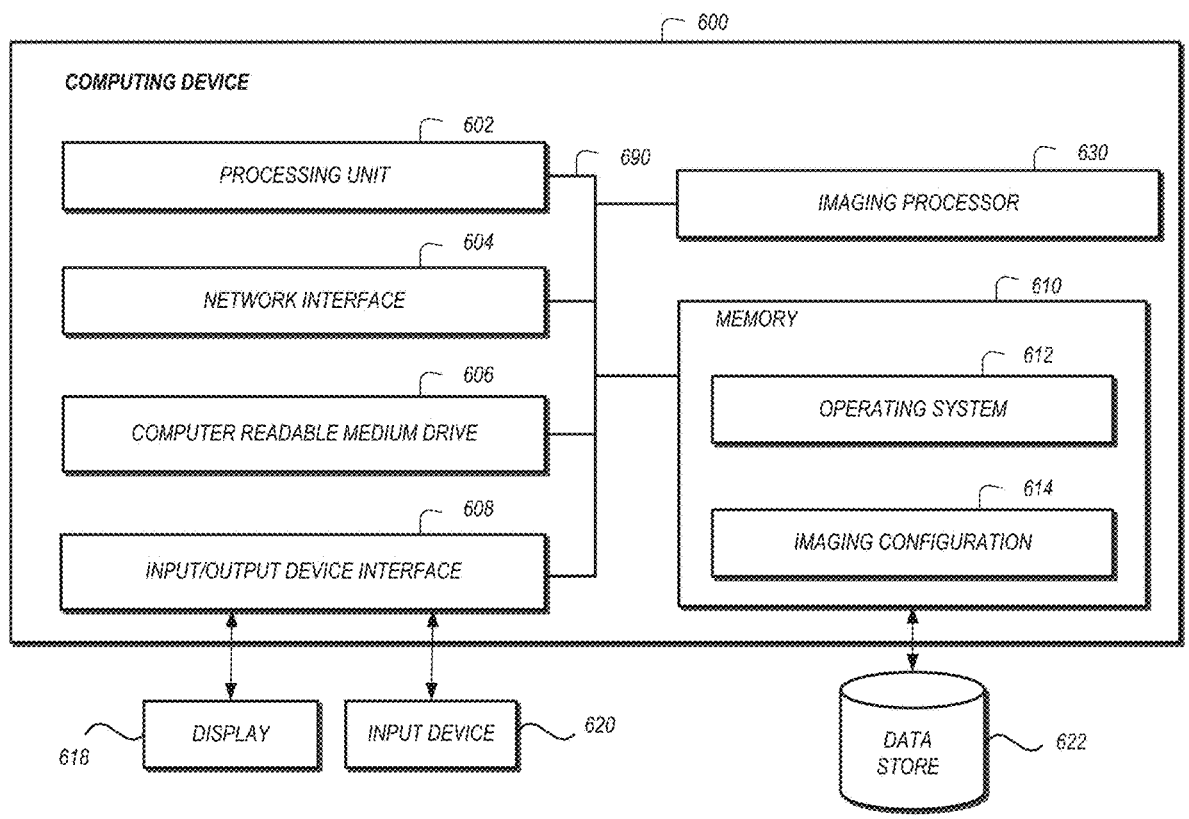
FIG. 6 is a block diagram of an illustrative computing device that may implement one or more of the image capturing assistance features described.

FIG. 6 is a block diagram of an illustrative computing device that may implement one or more of the image capturing assistance features described. The computing device 600 may implement the methods or messaging shown in FIG. 2 or 4. The computing device 600 can be a server or other computing device, and can comprise a processing unit 602, an imaging processor 630, a network interface 604, a computer readable medium drive 606, an input/output device interface 608, and a memory 610. The network interface 604 can provide connectivity to one or more networks or computing systems. The processing unit 602 can receive information and instructions from other computing systems or services via the network interface 604. The network interface 604 can also store data directly to memory 610. The processing unit 602 can communicate to and from memory 610 and output information to an optional display 618 via the input/output device interface 608. The input/output device interface 608 can also accept input from the optional input device 620, such as a keyboard, mouse, digital pen, microphone, mass storage device, etc.

The memory 610 contains computer program instructions that the processing unit 602 executes in order to implement one or more embodiments. The memory 610 may include RAM, ROM, and/or other persistent, non-transitory computer readable media. The memory 610 can store an operating system 612 that provides computer program instructions for use by the processing unit 602 or other elements included in the computing device in the general administration and operation of the computing device 600. The memory 610 can further include computer program instructions and other information for implementing aspects of the present disclosure.

For example, in one embodiment, the memory 610 includes an imaging configuration 614. The imaging configuration 614 may include thresholds, templates, or other predetermined or configurable values described above. The imaging configuration 614 may store specific values for a given configuration. The imaging configuration 614 may, in some implementations, store information for obtaining values for a given configuration element. For example, a natural language processing system may be specified as a network location (e.g., URL) in conjunction with username and password information to access the network location to submit an image for natural language processing. The imaging configuration 614 may be used by the imaging processor 630 to implement one or more of the aspects described herein. In some implementations, the imaging processor 630 may include specific computer executable instructions that cause the computing device 600 to perform one or more of the imaging features described.

The memory 610 may also include or communicate with one or more auxiliary data stores, such as data store 622. The data store 622 may electronically store data regarding the item, the delivery agent, the delivery device, the delivery location, monitoring devices, access control configurations for locations or devices, location security reference information, and the like.

The elements included in the computing device 600 may be coupled by a bus 690. The bus 690 may be a data bus, communication bus, or other bus mechanism to enable the various components of the computing device 600 to exchange information.

In some embodiments, the computing device 600 may include additional or fewer components than are shown in FIG. 6. For example, a computing device 600 may include more than one processing unit 602 and computer readable medium drive 606. In another example, the computing device 602 may not be coupled to the display 618 or the input device 620. In some embodiments, two or more computing devices 600 may together form a computer system for executing features of the present disclosure.

The features described may provide several non-limiting advantages. One example non-limiting advantage is to identify when an opportunity to capture images has arrived. Assistive devices may be activated to passively scan a location for photo opportunities. The passive scanning may include detecting an activation stimulus. As discussed, the stimulus can be audio based such as a wake word or user utterance. The stimulus can be image based such as detecting one or more people gathered in a particular area or detecting a gesture or other object within an image. In this way, awkward posing and timer configurations can be avoided to capture images in a natural and serendipitous fashion.

Another non-limiting advantage of the features described is to ensure the captured data is of a high quality. The quality metrics may include aesthetic quality, lighting quality, or image file quality (e.g., file size, compression ratio, etc.). In some instances, the user may not be an expert photographer or understand how to compose an image. The features described allow the system to identify the scene type and coordinate the image capturing and composition of the image. Composition feedback may be presented in a conversational manner that allows natural language interaction between the user and the image capturing system.

Having identified that a photo opportunity exists and identified the type of scene to be captured, a further non-limiting advantage of the features described is detecting when and which image to capture. Using image and/or audio processing, captured data may be analyzed to detect when a photo should be taken. Taking the image may be accompanied by playback of audio such as "Say cheese when ready" or a sound to draw attention of the subjects to the camera (e.g., squeak, silly song, etc.). In some implementations, multiple images may be captured. In such instances, a selection of the "best" image may be based on analysis of the image such as to detect facial expressions, positioning, lighting, location, or other aspect of the subjects shown in the image.

While shown as separate elements, the assistive features described may be integrated or commonly implemented. For example, all or a portion of the image composition service 150 may be included in the assistive device 140. As another example, the assistive device 140 may include the image capturing device 130. For example, a smartphone may commonly implement features of the assistive device 140 and the image capturing device 130. Furthermore, features may be distributed. For example, the features of the image composition service 150 may be implemented as multiple different networked services (e.g., scene detection, feedback identification, image quality assessment, etc.).

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations, or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by an image capturing system or other hardware included in an image capturing system. The image capturing system or other hardware included in a image capturing system may include a digital signal processor (DSP), an application specific integrated circuit (ASIC), a field programmable gate array (FPGA), a microprocessor, a controller, microcontroller, or other programmable logic element, discrete gate or transistor logic, discrete hardware components, or any combination thereof. Such image capturing system devices are specially designed to perform the capturing and processing described herein. An image capturing system device may include electrical circuitry configured to process specific computer-executable capture or capture data processing instructions to perform one or more of the features described herein. In embodiments where the image capturing system device includes a FPGA or similar programmable elements, the image capturing system device may provide capture or capture data processing without processing computer-executable instructions but instead by configuring the FPGA or similar programmable element to perform the recited features. Although described herein primarily with respect to digital technology, an image capturing system device may also include primarily analog components. For example, some or all of the capture or capture processing feature described herein may be implemented in analog circuitry or mixed analog and digital circuitry.

The elements of a method, process, routine, or algorithm described in connection with the embodiments disclosed herein can be embodied directly in image capturing system hardware, in a software module executed by an image capturing system device, or in a combination of the two. An image capturing system software module can reside in RAM memory, flash memory, ROM memory, EPROM memory, EEPROM memory, registers, hard disk, a removable disk, a CD-ROM, or similar form of a non-transitory computer-readable storage medium. An exemplary storage medium can be coupled to the image capturing system device such that the image capturing system device can read information from, and write information to, the storage medium. In the alternative, the storage medium can be integral to the image capturing system device. The image capturing system device and the storage medium can reside in an ASIC. The ASIC can reside in a device configured to capture or process data such as a microphone, a smartphone, a set-top-box, a tablet computer, a desktop computer, or the like. In the alternative, the image capturing system device and the storage medium can reside as discrete components in a device configured to capture or process captured data.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, generating, obtaining, looking up (e.g., looking up in a table, a database or another data structure), ascertaining and the like via a hardware element without user intervention. Also, "determining" may include receiving (e.g., receiving information), accessing (e.g., accessing data in a memory) and the like via a hardware element without user intervention. Also, "determining" may include resolving, selecting, choosing, establishing, and the like via a hardware element without user intervention.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein, the terms "provide" or "providing" encompass a wide variety of actions. For example, "providing" may include storing a value in a location of a storage device for subsequent retrieval, transmitting a value directly to the recipient via at least one wired or wireless communication medium, transmitting or storing a reference to a value, and the like. "Providing" may also include encoding, decoding, encrypting, decrypting, validating, verifying, and the like via a hardware element.

As used herein a "user interface" (also referred to as an interactive user interface, a graphical user interface, an interface, or a UI) may refer to a network based interface including data fields and/or other controls for receiving input signals or providing electronic information and/or for providing information to the user in response to any received input signals. A UI may be implemented in whole or in part using technologies such as hyper-text mark-up language (HTML), ADOBE® FLASH®, JAVA®, MICROSOFT® .NET®, web services, and rich site summary (RSS). In some implementations, a UI may be included in a stand-alone client (for example, thick client, fat client) configured to communicate (e.g., send or receive data) in accordance with one or more of the aspects described.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:
    under control of one or more computing devices executing specific computer-executable instructions,
    receiving, from an image capturing device, a first image of a scene, wherein the first image is captured by the image capturing device in response to an audible command;
    identifying a first image characteristic of the first image;
    selecting, from a plurality of composition templates, a composition template for the scene, wherein the composition template specifies a target image characteristic;
    applying a first machine learning model to image data for the first image to determine a deviation between the first image characteristic of the first image and the target image characteristic of the composition template;
    determining an adjustment for the first image characteristic to be made in capturing a second image of the scene to reduce the deviation between the first image characteristic and the target image characteristic;
    causing output of a first audible composition message, wherein the first audible composition message indicates the adjustment for the first image characteristic to be made in capturing the second image of the scene;
    receiving an audible response to the first audible composition message;
    in response to receiving the response to the audible response to the first audible composition message, determining that some deviation between the first image characteristic of the first image and the target image characteristic remains;
    generating a second audible composition message based at least in part on the first audible composition message, wherein the second audible composition message indicates a further adjustment to be made in capturing the second image of the scene;
    causing output of the second audible composition message;
    capturing the second image of the scene;
    determining, based at least in part on the composition template and the second image of the scene, that the second image includes the adjustment for the first image characteristic and the further adjustment; and
    causing output of an audible confirmation message, wherein the audible confirmation message indicates the second image contains a reduced deviation from the target image characteristic.

2. The computer-implemented method of claim 1, wherein
    determining that the second image includes the adjustment for the first image characteristic comprises:
        identifying a second image characteristic for the second image; and
        determining that the second image characteristic corresponds to the target image characteristic for the composition template.

3. The computer-implemented method of claim 1, wherein selecting the composition template for the scene comprises:
    applying a second machine learning model to image data from the first image of the scene;
    identifying a scene type for the scene from a result of applying the second machine learning model; and
    selecting, based at least in part on the scene type, the composition template for the scene from a plurality of composition templates.

4. The computer-implemented method of claim 1, wherein the audible command comprises audio data representing a user utterance of a command.

5. The computer-implemented method of claim 1, wherein the first image characteristic comprises a location of an object shown in the scene, a color of the scene, a light level of the scene, and a resolution of the scene.

6. A system comprising:
    a computer-readable memory storing executable instructions; and
    one or more computer processors in communication with the computer-readable memory, wherein the one or more computer processors are configured to execute the executable instructions to at least:
        receive, from an image capturing device, a first image of a scene in a field of view of the image capturing device, wherein the first image of the scene comprises image data;
        identify an image characteristic of the first image;
        select, from a plurality of composition templates, a composition template for the scene, wherein the composition template specifies a target image characteristic;
        apply a machine learning model to the image data to identify a deviation of the image characteristic of the first image from the target image characteristic;
        generate, based at least in part on the deviation of the image characteristic of the first image from the target image characteristic, a first instruction for an adjustment to apply in capturing a second image of the scene, wherein application of the adjustment reduces the deviation between the image characteristic of the first image and the target image characteristic of the composition template;

receive an audible response to the first instruction; and generate, in response to the audible response to the first instruction, a second instruction for a further adjustment to apply in capturing the second image of the scene, wherein the second instruction is generated based at least in part on the first instruction, and wherein to generate the second instruction, the one or more computer processors are configured to execute the executable instructions to at least determine that some deviation between the image characteristic of the first image and the target image characteristic remains.

7. The system of claim 6, wherein the first instruction comprises a control signal, and wherein the one or more computer processors are configured to execute further executable instructions to at least issue the control signal to the image capturing device.

8. The system of claim 6, wherein the image characteristic of the first image comprises a location of an object shown in the scene, a color of the scene, a light level of the scene, and a resolution of the scene.

9. The system of claim 6, wherein to select the composition template for the scene, the one or more computer processors are configured to execute further executable instructions to at least:

identify, based at least in part on the image data, a scene type for the scene; and select the composition template, from the plurality of composition templates, based at least in part on the scene type.

10. The system of claim 9, wherein the one or more computer processors are configured to execute further executable instructions to at least identify the scene type based at least in part on at least one of:

an object in the first image,
an object type associated with the object,
a color analysis of the first image,
an orientation of the first image,
an estimated age of a subject in the first image,
audio data related to the first image,
a time when the first image was captured, or
a location where the first image was captured.

11. The system of claim 6, wherein the one or more computer processors are configured to execute further executable instructions to at least:

receive, from the image capturing device, the second image of the scene;

determine that the second image includes the adjustment; and cause output of a confirmation message indicating that the second image was captured.

12. A computer-implemented method of assisted image capturing, the computer-implemented method comprising:

under control of one or more computing devices executing specific computer-executable instructions, receiving, from an imaging device, image data for a first image captured by the imaging device, wherein the first image is of a scene;

selecting, based at least in part on the image data for the first image, a scene template for the scene from a plurality of scene templates;

applying a first machine learning model to the image data for the first image;

identifying a deviation between the scene and the scene template from an output of the first machine learning model;

determining an adjustment for the scene that reduces the deviation between the scene and the scene template;

generating a first instruction for an adjustment to apply in capturing a second image of the scene, wherein application of the adjustment reduces the deviation between the scene and the scene template;

receiving an audible response to the first instruction; and generating, in response to the audible response to the first instruction, a second instruction for a further adjustment to apply in capturing the second image of the scene, wherein the second instruction is generated based at least in part on the first instruction, and wherein generating the second instruction further comprises determining that some deviation between the scene and the scene template remains.

13. The computer-implemented method of claim 12, wherein selecting the scene template further comprises:

applying a second machine learning model to the image data for the first image;

identifying a scene type for the scene from an output of the second machine learning model; and selecting, based at least in part on the scene type, the scene template from the plurality of scene templates.

14. The computer-implemented method claim 12, wherein selecting the scene template further comprises:

receiving, from the imaging device, metadata indicating at least one of a time when the first image was captured, or a location where the first image was captured;

identifying a scene type based at least in part on the metadata; and selecting, based at least in part on the scene type, the scene template.

15. The computer-implemented method of claim 12, wherein at least one of the first instruction or the second instruction comprises an audible message, and wherein the computer-implemented further comprises causing presentation, via an audio output device, of the audible message.

16. The computer-implemented method of claim 12, wherein the first instruction comprises a control signal, and wherein the computer-implemented method further comprises transmitting the control signal to the imaging device.

17. The computer-implemented method of claim 12, further comprising:

receiving, from the imaging device, image data for the second image captured by the imaging device, wherein the second image is of the scene;

determining, based at least in part on the scene template and the image data for the second image, that the application of the adjustment reduced the deviation between the scene and the scene template; and generating a message indicating that the second image contains a reduced deviation from the scene template.

18. The computer-implemented method of claim 12, wherein the first image of the scene is captured by the imaging device in response to an audible command.

* * * * *